(12) United States Patent
Oda et al.

(10) Patent No.: US 7,775,132 B2
(45) Date of Patent: Aug. 17, 2010

(54) TRANSAXLE FOR A VEHICLE (75) Inventors: Kaoru Oda, Akashi (JP); Taisuke Morita, Itami (JP); Izumi Takagi, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 450 days.

(21) Appl. No.: 11/900,597

(22) Filed: Sep. 11, 2007

(65) Prior Publication Data
US 2008/0070738 A1    Mar. 20, 2008

(30) Foreign Application Priority Data
Sep. 14, 2006    (JP)    ............... 2006-249697

(51) Int. Cl.
*F16H 3/091*    (2006.01)
(52) U.S. Cl. ...................................... 74/329
(58) Field of Classification Search ............... 74/329, 74/665 GE
See application file for complete search history.

(56) References Cited
U.S. PATENT DOCUMENTS
6,413,184 B1 *    7/2002    Yoshimura ............ 475/204

2006/0058148 A1 *    3/2006    Miyazaki et al. ............ 475/200

FOREIGN PATENT DOCUMENTS
JP    62-234726    10/1987
JP    2006-082662    3/2006

* cited by examiner

*Primary Examiner*—Sherry L Estremsky
*Assistant Examiner*—Edwin A. Young
(74) *Attorney, Agent, or Firm*—Alleman Hall McCoy Russell & Tuttle LLP (57) ABSTRACT

A transaxle for a vehicle comprises a transaxle casing; an input shaft housed in the transaxle casing and configured to receive as an input a driving power from an engine of the vehicle; an intermediate shaft housed in the transaxle casing; an axle housed in the transaxle casing and configured to drive a rear wheel of the vehicle; a rearward travel gear mechanism which is mounted between the input shaft and the intermediate shaft and is configured to transmit the driving power for moving the vehicle rearward from the input shaft to the intermediate shaft; a forward travel chain mechanism configured to transmit the driving power for moving the vehicle forward from the input shaft to the intermediate shaft; and a transmission gear mechanism which is mounted between the intermediate shaft and the axle and is configured to transmit the driving power from the intermediate shaft to the axle.

6 Claims, 6 Drawing Sheets

PRIOR ART

PRIOR ART

Fig. 6

TRANSAXLE FOR A VEHICLE

TECHNICAL FIELD

The present invention relates to a transaxle typically equipped in a low-speed vehicle, and particularly to a transaxle for a vehicle which is suitable for use with a low-speed vehicle such as a golf cart or a utility vehicle.

BACKGROUND ART

As examples of engine-driven low-speed vehicles which travel at relatively low speeds, there are golf carts, utility vehicles, and others, which are hereinafter collectively referred to as low-speed vehicles. In these low-speed vehicles, a transaxle reduces the speed of a driving power of the engine and rotates its axles with the reduced speed. The transaxle also has a rearward travel function and is configured to be able to switch between forward travel and rearward travel by switching a shift sleeve.

Figure 3A:
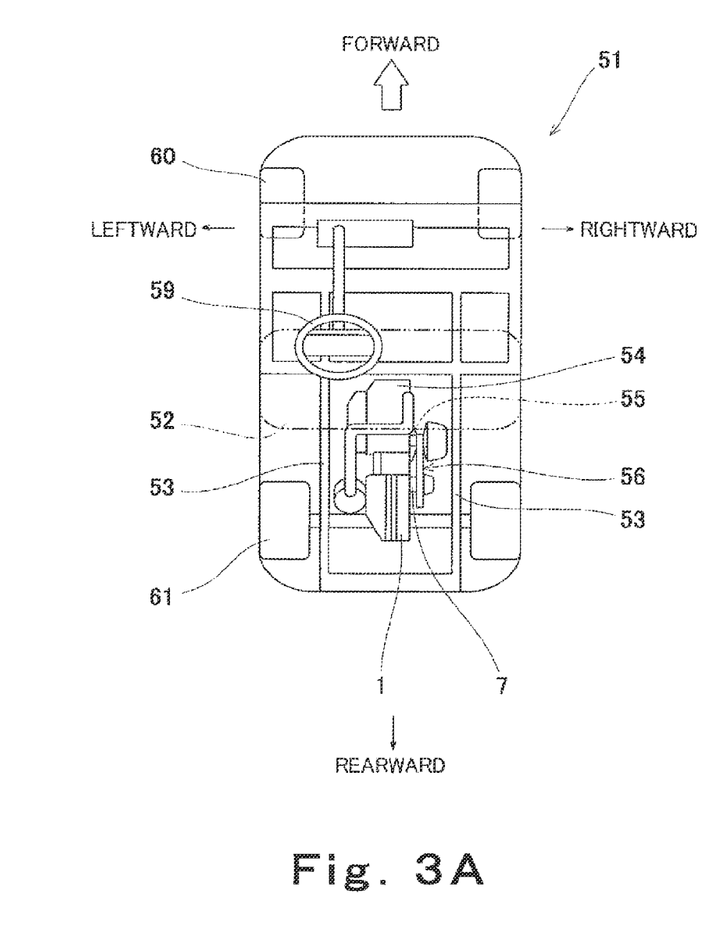
Figure 3B:
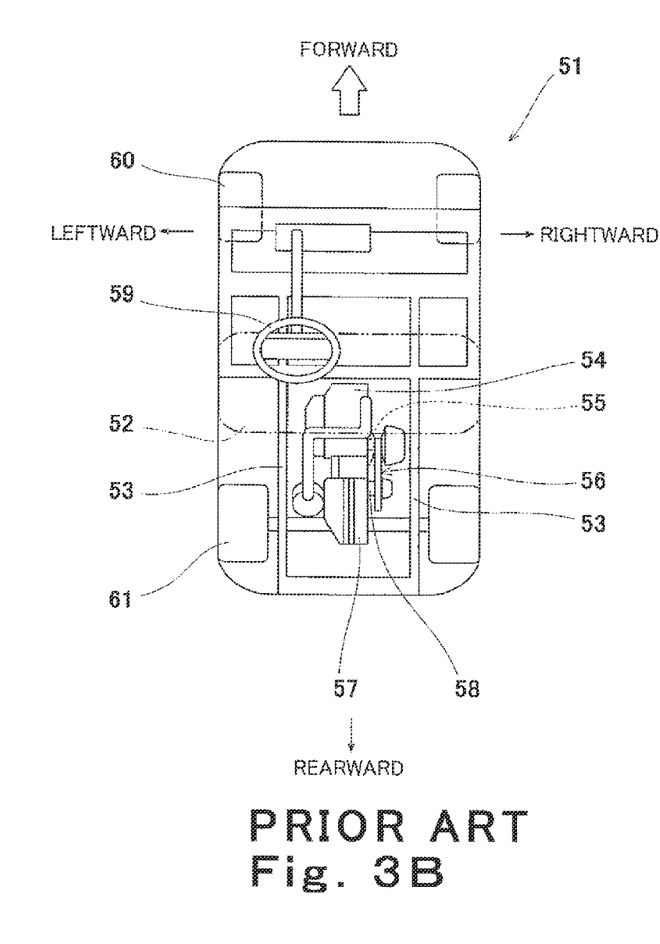

A driving unit which is typically equipped in a low-speed vehicle, for example, a golf cart, will be described with reference to FIG. 3B. FIG. 3B is a plan view showing in perspective a driving system for a golf cart 51. Turning now to FIG. 3B, the golf cart 51 is equipped with front wheels 60 which are positioned at a front portion (upper side in FIG. 3B) of a vehicle body thereof and is configured to be operated by a handle 59, and rear wheels 61 which are positioned at a rear portion of the vehicle body and is configured to be driven by an output shaft 55 of an engine 54. In the golf cart 51, the engine 54 and a transaxle 57 are respectively arranged forward and rearward in a narrow space between vehicle frames 53 under a seat 52. A driving power of the output shaft 55 of the engine 54 is transmitted to an input shaft 58 of the transaxle 57 located rearward via a continuously variable transmission (CVT) 56 which is a power transmission system mounted on a right side of the engine 54. In this configuration, the input shaft 58 of the transaxle 57 is driven to be rotated in the same direction as the output shaft 55 of the engine 54.

Figure 4:
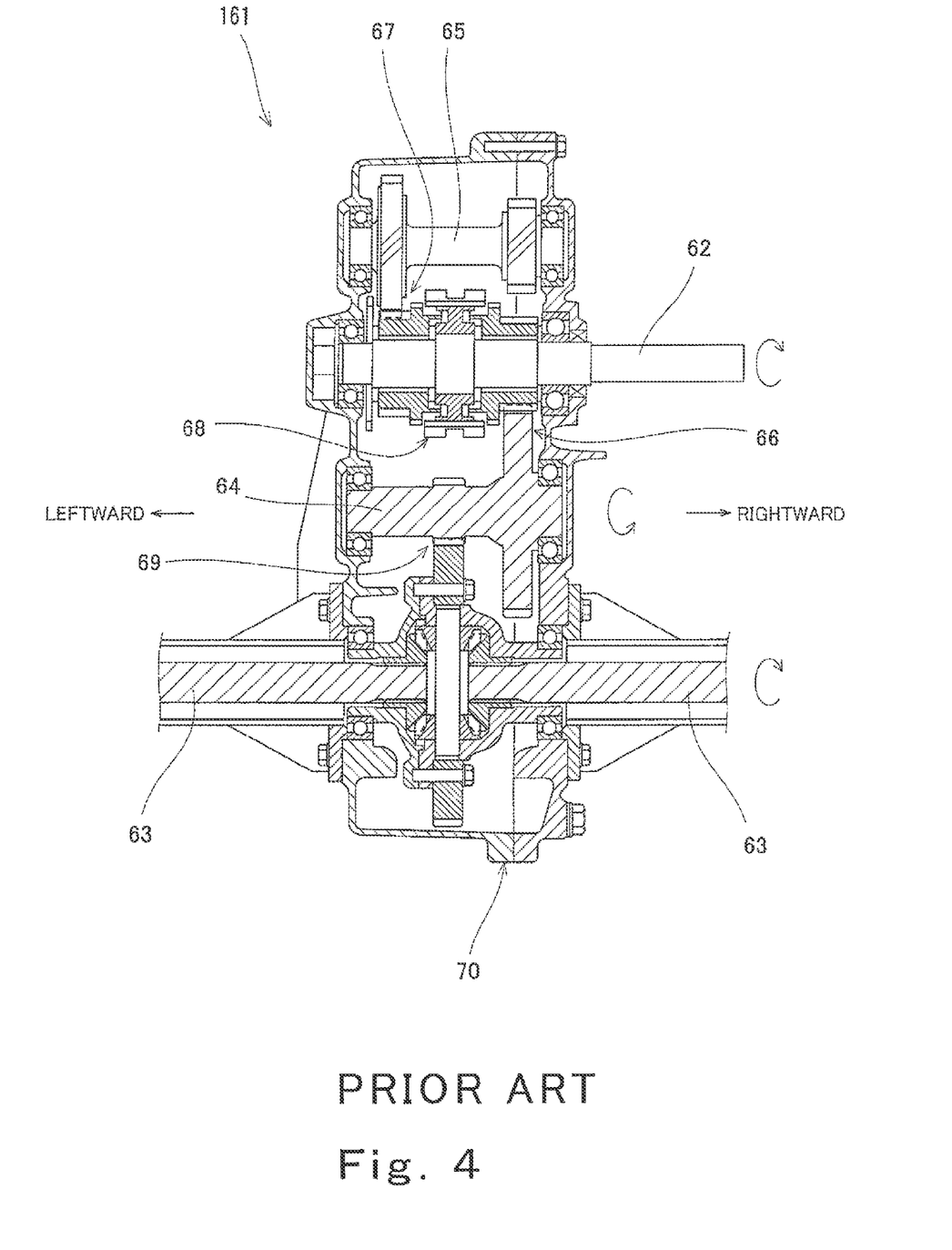
FIG. 4 is an exploded cross-sectional view showing one example of a conventional transaxle for a vehicle, including center axes of respective shafts of the transaxle.

FIG. 4 is an exploded cross-sectional view showing a conventional mechanical reduction gear transaxle 161, which is one type of the above described transaxle for the engine-driven low speed vehicle. The mechanical reduction gear transaxle 161 is provided with an intermediate shaft 64 between an input shaft 62 and axles 63, and an idle shaft 65 for rearward travel between the input shaft 62 and the intermediate shaft 64. The transaxle 161 is configured in such a manner that a shift sleeve 68 switches between a forward travel gear mechanism 66 mounted between the input shaft 62 and the intermediate shaft 64 and a rearward travel gear mechanism 67 mounted between the input shaft 62 and the idle shaft 65, enabling the axles 63 to be rotated for forward travel or for rearward travel. In FIG. 4, arrows illustrated on the right side of the transaxle 161 indicate rotational directions of the respective shafts during rotation for forward travel. When the shift sleeve 68 is switched and coupled to the forward travel gear mechanism 66, the axles 63 are rotated clockwise when the transaxle 161 is viewed from rightward (from the input side of the input shaft 62) via a transmission gear mechanism 69 between the intermediate shaft 64 and the axle 63 so that the vehicle body travels forward. On the other hand, when the shift sleeve 68 is switched and coupled to the rearward travel gear mechanism 67, the axles 63 are rotated counterclockwise when the transaxle 161 is viewed from rightward via the transmission gear mechanism 69 between the intermediate shaft 64 and the axle 63 so that the vehicle body travels rearward. With this configuration, the axles 63 can be rotated clockwise when viewed from rightward of the transaxle 161 while speed reduction in forward travel is performed in a minimum of two stages by the forward travel gear mechanism 66 and the transmission gear mechanism 69.

To rotate the axles 63 clockwise in this configuration, the input shaft 62 is required to be rotated clockwise for forward travel. In this case, the output shaft 55 (FIG. 3B) of the engine 54 (FIG. 3B) configured to drive the input shaft 62 via the CVT 56 (FIG. 3B) needs to be rotated clockwise as well. For this reason, the transaxle 161 is incompatible with a general purpose engine whose output shaft 55 is rotated counterclockwise when the engine 54 is seen from the output shaft 55 side. Therefore, there arises a need for a special engine configured to be rotated clockwise, whose output shaft is rotated in the same direction as the input shaft 62 of the transaxle 161. In addition, since the transaxle 161 having the above configuration has four shafts consisting of the input shaft 62, the intermediate shaft 64, the rearward travel idle shaft 65, and the axles 63, a casing 70 having a sufficient size to accommodate these four shafts becomes necessary.

Figure 5:
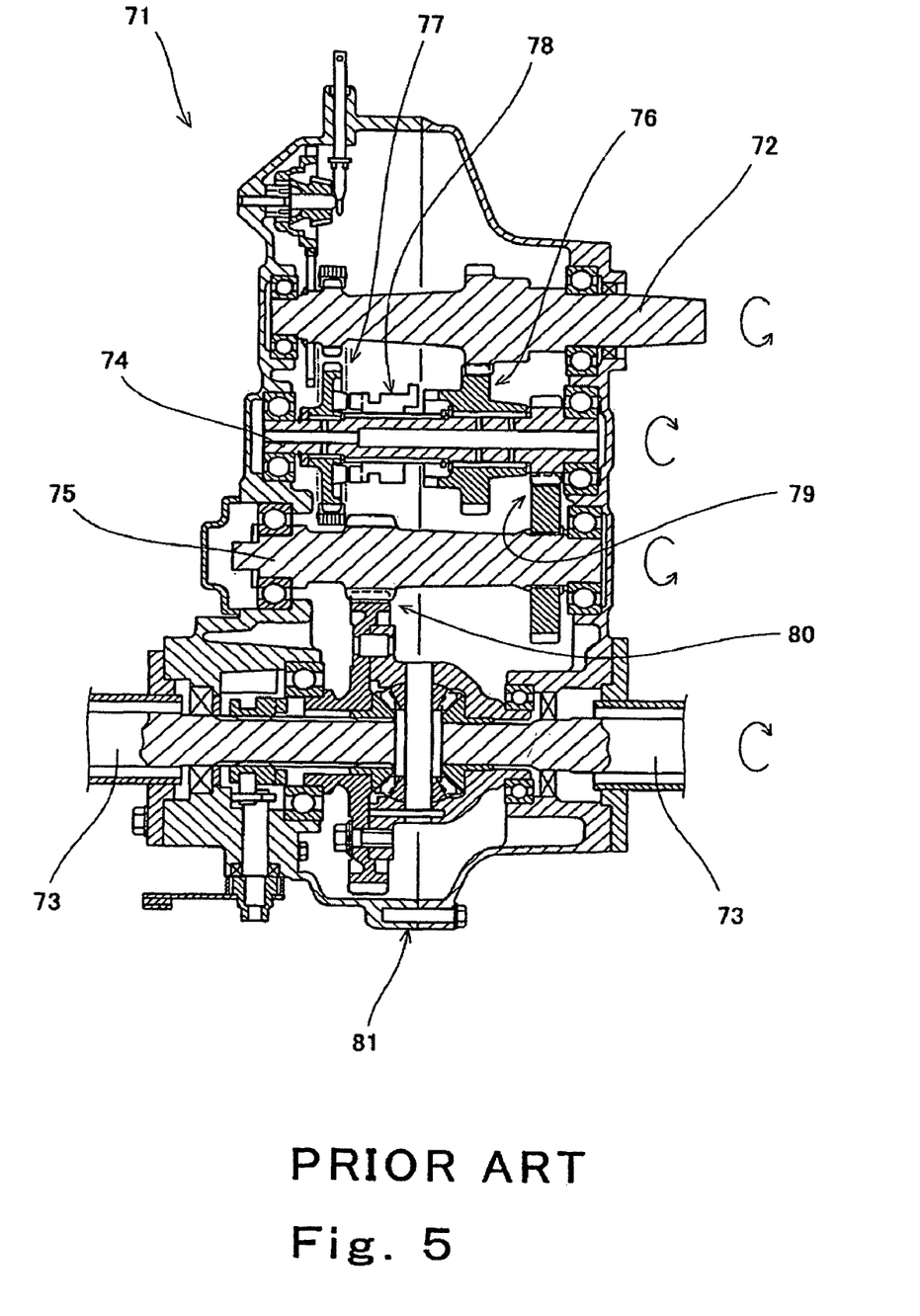
FIG. 5 is an exploded cross-sectional view showing another example of the conventional transaxle for the vehicle.
Figure 6:
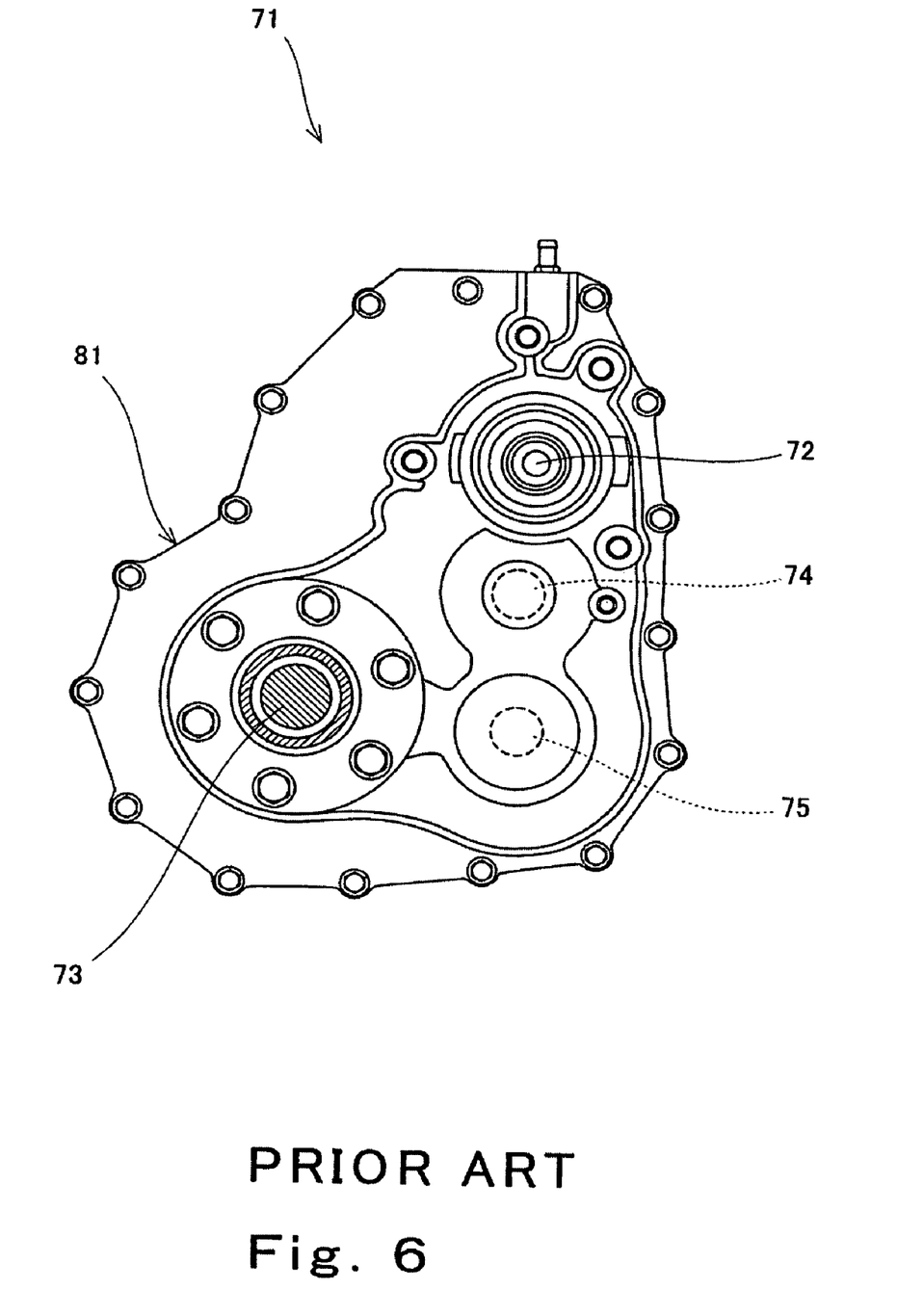
FIG. 6 is a side view of the transaxle of FIG. 5.

Under the circumstances, there has been a need for a transaxle configured to be driven by the general purpose engine whose output shaft is rotatable counterclockwise (to the left) when the engine is seen from the output shaft side, rather than the special engine whose output shaft is rotatable clockwise. FIGS. 5 and 6 are side views showing an example of a transaxle configured to be driven by the general purpose engine whose output shaft is rotatable counterclockwise (to the left) when the engine is seen from the output shaft side. As shown in FIGS. 5 and 6, a transaxle 71 for a vehicle includes two intermediate shafts 74 and 75 which are mounted between an input shaft 72 and axles 73 and is configured in such a manner that a shift sleeve 78 switches between a forward travel gear mechanism 76 and a rearward travel chain mechanism 77 mounted between the input shaft 72 and the intermediate shaft 74, causing the axles 73 to be rotated for forward travel or for rearward travel. Such prior art is disclosed in Japanese Laid-Open Patent Application Publication No. Hei. 2006-82662 or No. Sho. 62-234726.

In the configuration of FIG. 5, when the shift sleeve 78 is switched and coupled to the forward travel gear mechanism 76, counterclockwise rotation transmitted to the input shaft 72 is transmitted from the input shaft 72 to the intermediate shaft 74 and further to the intermediate shaft 75 via the transmission gear mechanism 79, and further from the intermediate shaft 75 to the axles 73 via a transmission gear mechanism 80 mounted between the intermediate shaft 75 and the axles 73, causing the axles 73 to be rotated clockwise when the transaxle 71 is seen from rightward in FIG. 5. Thereby, the vehicle travels forward. On the other hand, when the shift sleeve 78 is switched and coupled to the rearward travel chain mechanism 77, the rotation of the input shaft 72 is transmitted to the intermediate shaft 74 via the rearward travel chain mechanism 77 and further from the intermediate shaft 75 to the axles 73 via the transmission gear mechanism 80, causing the axles 73 to be rotated counterclockwise when the transaxle 71 is seen from rightward in FIG. 5. Thereby, the vehicle travels rearward. According to the transaxle 71 having the above configuration, the axles 73 can be rotated clockwise even though the input shaft 72 is rotated counterclockwise during forward travel as indicated by arrows in FIG. 5. However, two intermediate shafts 74 and 75 become necessary between the input shaft 72 and the axles 73 and hence a casing 81 having a size sufficient to accommodate the intermediate shafts 74 and 75 also becomes necessary.

As described above, in the low-speed vehicles such as the golf cart 51, the engine 54 and the transaxle 57 are typically mounted in a narrow space under the seat 52. Therefore, the engine 54 and the transaxle 57 have been expected to keep silent and have more compact configuration.

In order to achieve the silence in the above described mechanical gear reduction configuration, it is necessary to produce gears so that their tooth profile and tooth trace are precise. So, gear production has been time-consuming and expensive. Under these conditions, there has been a need for a transaxle which is capable of achieving silence while reducing a cost to be consumed for the gear production.

Furthermore, since the engine is limited in improving compactness, improving compactness of the transaxle is an important issue at present.

However, since both of the transaxle 161 and the transaxle 71 have four shafts as described above, the casings 70 and 81 having sizes sufficient to accommodate these four shafts become necessary. The low-speed vehicle into which the transaxle 161 or 71, which has such a large-sized casing 70 or 81, is mounted is forced to be designed with less flexibility.

SUMMARY OF THE INVENTION

The present invention addresses the above described conditions, and an object of the present invention is to provide a transaxle for a vehicle which is capable of reducing noise during forward travel and has a compact configuration.

According to the present invention, there is provided a transaxle for a vehicle comprising: a transaxle casing; an input shaft housed in the transaxle casing, the input shaft being configured to receive as an input a driving power from an engine of the vehicle; an intermediate shaft housed in the transaxle casing so as to extend parallel to the input shaft; an axle housed in the transaxle casing so as to extend parallel to the intermediate shaft, the axle being configured to drive a rear wheel of the vehicle; a rearward travel gear mechanism which is mounted between the input shaft and the intermediate shaft and is configured to transmit the driving power for traveling the vehicle rearward from the input shaft to the intermediate shaft; a forward travel chain mechanism configured to transmit the driving power for moving the vehicle forward from the input shaft to the intermediate shaft; and a transmission gear mechanism which is mounted between the intermediate shaft and the axle and is configured to transmit the driving power from the intermediate shaft to the axle. In accordance with such a configuration, since the driving power for forward travel is transmitted via the chain, silence of the transaxle in the forward travel can be improved. In addition, since the driving power for forward travel of the vehicle is transmitted via the chain, the intermediate shaft is rotated in the same direction as the input shaft, and the axle that is applied with the driving power from the intermediate shaft via the transmission gear mechanism is rotated in an opposite direction to the rotation of the input shaft. Therefore, in the transaxle, to which the driving power is transmitted via a CVT from a general purpose engine which is positioned forward of the transaxle and rotates counterclockwise, when the engine is seen from an output shaft side of the engine, the axle can be rotated clockwise which is an opposite direction to the rotation of the input shaft with the input shaft being rotated counterclockwise (the same direction to the rotation of the engine) during forward travel when the transaxle is seen from rightward (input side of the input shaft). During rearward travel, the intermediate shaft is rotated in the opposite direction to the rotation of the input shaft by a rearward travel gear mechanism, and the axle coupled to the intermediate shaft via the transmission gear mechanism is rotated in the opposite direction to the rotation of the intermediate shaft, i.e., counterclockwise from rightward. Thus, a compact transaxle including three shafts for performing gear reduction in two stages in both forward travel and rearward travel can be achieved.

The forward travel chain mechanism may include a silent chain. This makes it possible to improve noise reduction of the chain.

The silent chain may be a double chain or more. With the use of a silent chain with a small pitch, it becomes possible to suppress rotation variation that may occur on a downstream side when the double chain is used to transmit driving power. Thus, noise reduction can be improved.

A center axis of the intermediate shaft may be positioned below a straight line connecting a center axis of the input shaft to a center axis of the axle. This makes it possible to easily feed oil from an oil reservoir in the interior of the transaxle casing to the intermediate shaft.

The forward travel chain mechanism may be configured to be subjected to oil bath lubrication such that a part of the forward travel chain mechanism is immersed in oil in an oil reservoir provided at a bottom portion of the transaxle casing. This makes it possible to improve durability of the chain, and to reduce labor required to maintain and inspect the transaxle mounted in a narrow space of a vehicle body of the low-speed vehicle.

The above and further objects and features of the invention will more fully be apparent from the following detailed description with accompanying drawings.

BRIEF DESCRIPTION OF THE DRAWINGS

Each of FIGS. 3A and 3B is a plan view showing in perspective a driving system of a golf cart which is one example of a low-speed vehicle.

DETAILED DESCRIPTION OF THE PREFERRED EMBODIMENTS

Figure 1:
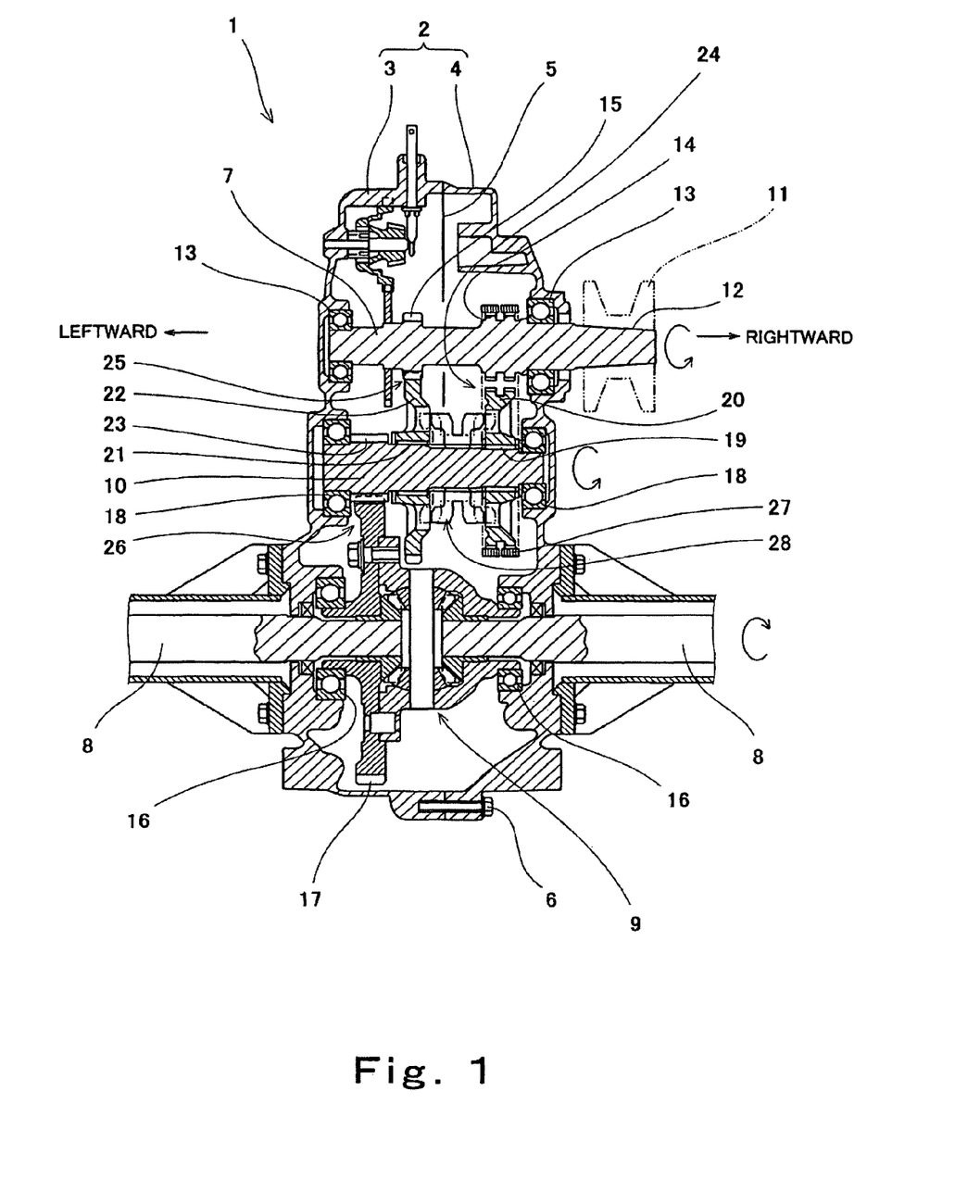
FIG. 1 is an exploded cross-sectional view showing a transaxle for a vehicle according to an embodiment of the present invention, including center axes of respective shafts of the transaxle.
Figure 2:
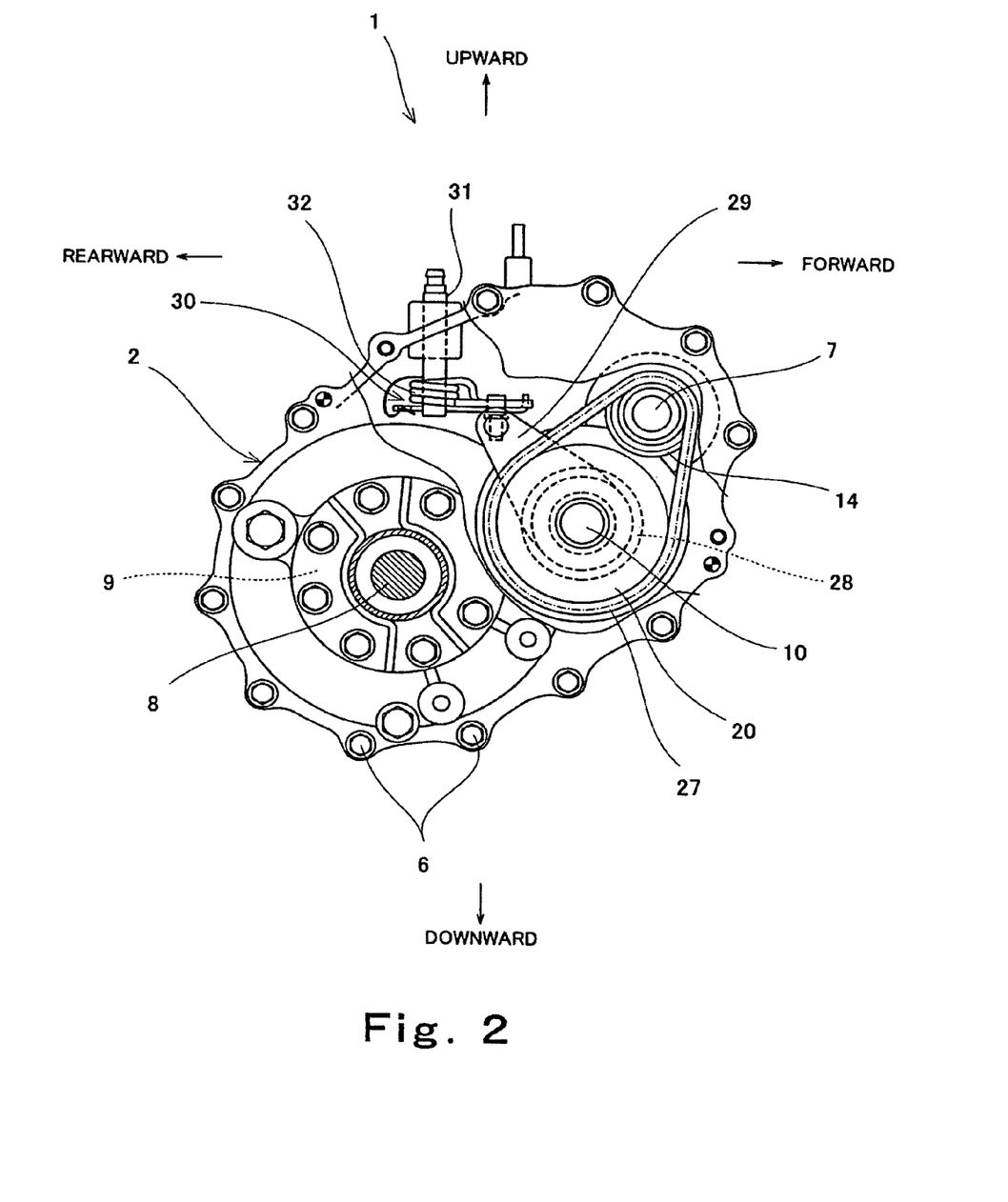
FIG. 2 is a side view showing a partial cross-section of the transaxle of FIG. 1.

Hereinafter, an embodiment of the present invention will be described with reference to the drawings. FIG. 1 is an exploded cross-sectional view showing a transaxle for a vehicle according to an embodiment of the present invention, including center axes of respective shafts of the transaxle. FIG. 2 is a side view showing a partial cross-section of the transaxle for the vehicle of FIG. 1. In FIG. 1, arrows indicate rotational directions during forward travel. As used herein, the rotational direction of the shafts which is viewed from an input side (rightward in FIG. 1) of an input shaft 7 of the transaxle 1 in the state shown in FIG. 1 is referred to as clockwise or counterclockwise. Also, the directions are referenced from the perspective of a rider riding in the vehicle of FIG. 1 except as where otherwise specifically described or illustrated.

As shown in FIG. 1, a transaxle casing 2 of the transaxle 1 includes a pair of right and left casing members 3 and 4. The casing members 3 and 4 are coupled to each other at a joint surface 5 in a substantially center region of the transaxle casing 2 by a plurality of bolts 6 provided at a periphery of the transaxle casing 2, forming the transaxle casing 2 of a unitary component. As shown in FIG. 2, the input shaft 7 is disposed in an upper portion of a front part of the transaxle casing 2 and is illustrated on an upper side in FIG. 1. As shown in FIG. 3A, a driving power of an engine 54 is input to an input shaft 7 through a continuous variable transmission (CVT) 56 as in a conventional vehicle. As shown in FIGS. 1 and 2, a differential gear mechanism 9 is mounted in a rear region of a lower part of the transaxle casing 2 and is configured to rotate right and left axles 8 which are driving shafts to drive rear wheels. An intermediate shaft 10 is mounted between the input shaft 7 and the axles 8 and is configured to transmit the driving power from the input shaft 7 to the axles 8.

As shown in FIG. 1, the input shaft 7, the intermediate shaft 10, and the axle 8 are housed in the transaxle casing 2. The input shaft 7 protrudes from the transaxle casing 2 to outside at an end portion thereof. The end portion has a tapered portion 12 to which a driven pulley 11 of the CVT 56 (FIG. 3A) coupling the engine 54 to the transaxle 1 is attached. The input shaft 7 is rotatably supported by right and left bearings 13 mounted in the interior of the transaxle casing 2. A forward travel driving sprocket 14 is mounted between the bearings 13 of the input shaft 7 to be positioned in close proximity to an inner side of the bearing 13 located on the tapered portion 12 side. A rearward travel driving gear 15 is mounted on the opposite side of the tapered portion 12 with respect to the sprocket 14.

The axles 8 respectively protrude rightward and leftward from the transaxle casing 2. The axles 8 are driven to be rotated in the same direction by the differential gear mechanism 9 mounted between the right and left axles 8. The differential gear mechanism 9 is rotatably supported by right and left bearings 16 mounted in the interior of the transaxle casing 2. The differential gear mechanism 9 is provided with an input gear 17 to which the driving power from the intermediate shaft 10 is input. The differential gear mechanism 9 is generally known, and will not be described in detail.

The intermediate shaft 10 is rotatably supported by right and left bearings 18 mounted in the interior of the transaxle casing 2. A forward travel driven sprocket 20 which is rotatably supported to the intermediate shaft 10 by a needle bearing 19 and a rearward travel driven gear 22 which is rotatably supported to the intermediate shaft 10 by a needle bearing 21 are mounted between the bearings 18. The forward travel driven sprocket 20 is positioned opposite to the forward travel driving sprocket 14 attached to the input shaft 7. The rearward travel driven gear 22 is positioned opposite to the rearward travel driving gear 15 attached to the input shaft 7. The rearward travel driven gear 22 and the rearward travel driving gear 15 form a rearward travel gear mechanism 25. A transmission gear 23 is integrally mounted on the intermediate shaft 10 and is positioned opposite to the input gear 17 attached to the differential gear mechanism 9. The transmission gear 23 and the input gear 17 form a transmission gear mechanism 26.

As shown in FIGS. 1 and 2, a forward travel chain 27 is installed around the forward travel driving sprocket 14 and the forward travel driven sprocket 20. The forward travel driving sprocket 14, the forward travel driven sprocket 20, and the forward travel chain 27 form a forward travel chain mechanism 24. In this embodiment, the forward travel chain 27 is a silent double chain. Since the chain 27 has a small pitch and is silent, noise can be reduced. In addition, since the chain 27 is a double chain, a sufficient power transmission capability can be achieved. The chain 27 is provided to transmit the driving power for forward travel.

As shown in FIG. 1, a shift sleeve 28 is mounted between the forward travel driven sprocket 20 and the rearward travel driven gear 22 and is spline-coupled to the intermediate shaft 10 so that the shift sleeve 28 is movable along an axial direction of the intermediate shaft 10. The shift sleeve 28 is configured to switch so that the driving power (rotational force) of either the forward travel driven sprocket 20 or the rearward travel driven gear 22 is transmitted to the intermediate shaft 10. By operating a shift plate 29 (FIG. 2) described later, the shift sleeve 28 is movable in the axial direction of the intermediate shaft 10 with the shift sleeve 28 spline-coupled to the intermediate shaft 10 to selectively engage with either the forward travel driven sprocket 20 or the rearward travel driven gear 22.

When the shift sleeve 28 is brought into engagement with the forward travel driven sprocket 20, the driving power of the forward travel driven sprocket 20 is transmitted to the intermediate shaft 10 via the shift sleeve 28, causing the intermediate shaft 10 to be rotated for forward travel. On the other hand, when the shift sleeve 28 is brought into engagement with the rearward travel driven gear 22, the driving power of the rearward travel driven gear 22 is transmitted to the intermediate shaft 10 via the shift sleeve 28, causing the intermediate shaft 10 to be rotated for rearward travel. In a state where the shift sleeve 28 is not in engagement, the forward travel driven sprocket 20 rotates alone at an outer periphery of the needle bearing 19 and the rearward travel driven gear 22 rotates alone at an outer periphery of the needle bearing 21. When the intermediate shaft 10 is rotated, the transmission gear 23 mounted on the intermediate shaft 10 causes the input gear 17 of the differential gear mechanism 9 to be rotated. By rotation of the input gear 17, the differential gear mechanism 9 causes the axles 8 to be rotated for forward travel or for rearward travel.

As should be appreciated from above, in accordance with the transaxle 1 for the vehicle, speed reduction in forward travel is performed in a minimum of two stages by the forward travel chain mechanism 24 and the transmission gear mechanism 26, while speed reduction in rearward travel is performed in a minimum of two stages by the rearward travel gear mechanism 25 and the transmission gear mechanism 26.

As shown in FIG. 2, the input shaft 7, the intermediate shaft 10, and the axles 8 which are mounted to the transaxle 1 are positioned in such a manner that the center axis of the intermediate shaft 10 is located below a straight line connecting the center axis of the input shaft 7 to the center axis of the axles 8. With such shaft positioning, the forward travel chain 27 is subjected to oil bath lubrication with the differential gear mechanism 9 mounted to the axles 8. Specifically, a part of the forward travel mechanism is immersed in oil in an oil reservoir provided at a bottom portion of the transaxle casing 2. Alternatively, the forward travel chain mechanism 24 may be lubricated by other suitable lubrication methods such as dip lubrication. Furthermore, as described above, since the three shafts are accommodated in the interior of the transaxle casing 2, a protruding portion of a lower part of the transaxle casing 2 in a side view can be reduced. The transaxle casing 2 thus configured compactly can be easily assembled into a narrow space in the low-speed vehicle.

Moreover, against a situation where the shift sleeve 28 is moved axially by the shift plate 29 but fails to engage with the forward travel driven sprocket 20 or the rearward travel driven gear 22, a biasing mechanism 30 is provided to apply an axial force to the shift sleeve 28 to cause the shift sleeve 28 to engage with the forward travel driven sprocket 20 or the rearward travel driven gear 22 in a rotational position where engagement is permitted. More specifically, the biasing mechanism 30 is configured so that a spring 32 mounted around an operational shaft 31 of the shift plate 29 applies force to the shift plate 29 to cause the shift sleeve 28 to engage with the forward travel driven sprocket 20 or the rearward travel driven gear 22 in a state where the forward travel driven sprocket 20 or the rearward travel driven gear 22 are rotated to a position where engagement is permitted. In FIG. 2, an inner diameter and an outer diameter of the forward travel chain 27 are indicated by solid lines and a pitch circle is indicated by a dotted line.

In accordance with the transaxle 1 for the vehicle constructed above, since the silent chain 27 is used in first stage speed reduction to transmit the driving power from the input shaft 7 to the intermediate shaft 10 for the forward travel, noise can be reduced during forward travel. In addition, since the silent chain 27 is a double chain and has a small pitch, a sufficient driving power transmission capability is gained while maintaining silence.

In accordance with the transaxle 1 for the vehicle, in both of the forward travel gear reduction and the rearward travel gear reduction, since a minimum of two-stage gear reduction is performed by using the three shafts 7, 8, and 10, the transaxle casing 2 can be made compact. Further, the axles 8 can be rotated clockwise, in the configuration to transmit via the CVT the driving power from a general purpose engine whose output shaft rotates counterclockwise and to cause the input shaft 7 of the transaxle 1 to be rotated counterclockwise during forward travel.

Although it is typically necessary that the gears be processed by shaving to provide a highly precise tooth profile and tooth trace for the purpose of silence, the sprockets 14 and 20 need not be processed so precisely, because of the use of the chain 27 in the first stage speed reduction in the transaxle 1. As a result, the transaxle 1 can be manufactured at a low cost.

Whereas the forward travel chain 27 is the double silent chain in this embodiment, it may be configured in other ways, depending on a transmission driving power or use conditions. The forward travel chain 27 may be constructed of a double chain or more.

Moreover, the present invention is applied to high-speed vehicles as well as the above described low-speed vehicles.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A transaxle for a vehicle comprising:
  a transaxle casing;
  an input shaft housed in the transaxle casing, the input shaft being configured to receive as an input a driving power from an engine of the vehicle;
  an intermediate shaft housed in the transaxle casing so as to extend in parallel with the input shaft;
  an axle housed in the transaxle casing so as to extend in parallel with the intermediate shaft, the axle being configured to drive a rear wheel of the vehicle;
  a rearward travel gear mechanism which is mounted between the input shaft and the intermediate shaft and is configured to transmit the driving power for moving the vehicle rearward from the input shaft to the intermediate shaft;
  a forward travel chain mechanism configured to transmit the driving power for moving the vehicle forward from the input shaft to the intermediate shaft; and
  a transmission gear mechanism which is mounted between the intermediate shaft and the axle and is configured to transmit the driving power from the intermediate shaft to the axle,
  wherein the rearward travel gear mechanism includes a drive gear mounted on the input shaft, and a driven gear which is mounted on the intermediate shaft and configured to mesh with the drive gear;
  wherein the forward travel chain mechanism includes a drive sprocket mounted on the input shaft, a driven sprocket mounted on the intermediate shaft, and a chain installed around the drive sprocket and the driven sprocket;
  and wherein the transmission gear mechanism includes a drive gear mounted on the intermediate shaft, and a driven gear which is mounted on the axle and configured to mesh with the drive gear.

2. The transaxle for the vehicle according to claim 1, wherein the forward travel chain mechanism includes a silent chain.

3. The transaxle for the vehicle according to claim 2, wherein the silent chain is at least a double chain.

4. The transaxle for the vehicle according to claim 1, wherein a center axis of the intermediate shaft is positioned below a straight line connecting a center axis of the input shaft to a center axis of the axle.

5. The transaxle for the vehicle according to claim 4, wherein the forward travel chain mechanism is configured to be subjected to oil bath lubrication such that a part of the forward travel chain mechanism is immersed in oil in an oil reservoir provided at a bottom portion of the transaxle casing.

6. The transaxle for the vehicle according to claim 1, further comprising:
  a sleeve which is slidable along a center axis of the intermediate shaft and is configured to selectively engage with the driven gear of the rearward travel gear mechanism or the driven sprocket of the forward travel chain mechanism;
  wherein in a state where the sleeve engages with the driven gear, a rotational force of the driven gear is transmitted to the intermediate shaft via the sleeve and the driven sprocket rotates alone around the intermediate shaft;
  and wherein in a state where the sleeve engages with the driven sprocket, a rotational force of the driven sprocket is transmitted to the intermediate shaft via the sleeve and the driven gear rotates alone around the intermediate shaft.

* * * * *